United States Patent
Oksala et al.

(10) Patent No.: US 6,694,135 B1
(45) Date of Patent: Feb. 17, 2004

(54) MEASUREMENT REPORT TRANSMISSION IN A TELECOMMUNICATIONS SYSTEM

(75) Inventors: Jarkko Oksala, Tampere (FI); Kari Hautamaki, Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/473,789

(22) Filed: Dec. 29, 1999

(30) Foreign Application Priority Data

Dec. 31, 1998 (GB) .............................. 9828875

(51) Int. Cl.⁷ ................................................ H04Q 7/20
(52) U.S. Cl. ........................ 455/424; 455/69; 455/522
(58) Field of Search ......................... 455/424, 69, 423, 455/522, 67, 170, 68, 88, 403, 575, 464, 466, 67.4, 226, 73; 370/346, 349, 469, 449, 347, 331, 332, 465, 550; 379/346, 349; 714/748, 749

(56) References Cited

U.S. PATENT DOCUMENTS

| | | | |
|---|---|---|---|
| 4,475,010 A | * 10/1984 | Huensch et al. | .......... 179/2 EB |
| 4,910,794 A | * 3/1990 | Mahany | ..................... 455/67.4 |
| 5,093,924 A | * 3/1992 | Toshiyuki et al. | ............ 455/33 |
| 5,633,875 A | * 5/1997 | Hershey et al. | ............. 370/346 |
| 5,960,335 A | * 9/1999 | Umemoto et al. | ........ 455/226.2 |
| 5,966,657 A | * 10/1999 | Sporre | ......................... 455/425 |
| 6,356,759 B1 | * 3/2002 | Mustajarvi | .................. 455/450 |
| 6,359,904 B1 | * 3/2002 | Hamalainen et al. | ....... 370/469 |
| 6,430,163 B1 | * 8/2002 | Mustajarvi | .................. 370/310 |

FOREIGN PATENT DOCUMENTS

WO  WO 98/44639  10/1998

\* cited by examiner

*Primary Examiner*—Edward F. Urban
*Assistant Examiner*—C. Chow
(74) *Attorney, Agent, or Firm*—Perman & Green, LLP

(57) ABSTRACT

A method of obtaining data messages at a radio communication network from a mobile station operating therein during downlink transfer, the method comprising the network providing a header portion of the downlink transfer with one or more unique polling codes for requesting the mobile station to transmit one or more respective data messages indicative of one or more corresponding conditions at the mobile station.

17 Claims, 2 Drawing Sheets

MEASUREMENT REPORT TRANSMISSION IN A TELECOMMUNICATIONS SYSTEM

BACKGROUND OF THE INVENTION

The present invention relates to information transfer between a mobile station and a radio communication network, and more particularly to a method designed to be employed in a radio communication network to obtain information from a mobile station about conditions at the mobile station during downlink transfer.

In normal wireless voice communications the telecommunication system sets up a two way communication link between a mobile station and a base station of the cellular network in which the mobile station is operating. By mobile station is meant any kind of radio communication device which operates in a cellular telecommunication system. The data stream for the voice communication is continuous and operates on a real time basis. The two way communication link consists of simultaneous transmission and reception, the base station transmits on one set of radio channels called the uplink and receives on another set of channels called the downlink. The transmit and receive channels assigned for a particular cell are separated by a fixed amount of frequency called the duplex spacing.

In addition to voice communications, digital cellular telecommunication systems increasingly support advanced high speed data services such as, short message service (SMS), broadcast paging, imaging services and fax services.

Both data and voice transmissions are improved by the emerging use of GPRS (General Packet Radio Services) protocol. GPRS provides for high speed packet radio access for GSM mobile station and routing protocols for the GSM network by the dynamic allocation of communication channels for voice and data transmissions. GPRS is defined in GSM 03.64 standard specification.

A feature of certain data services is that unlike voice transmissions, data services can be transferred unidirectionally and on a non-real time basis. For example, because paging messages can be delayed for several minutes without significant disadvantages to the receiver of the message, it allows short paging messages to be placed in a queuing system. Furthermore, the transfer of the paging message takes place in a unidirectional link from the network to the mobile station of the receiver, i.e. exclusively in a downlink transfer. When the network is transferring data in a unidirectional downlink transmission, the network must nevertheless obtain certain information from the mobile station in order to keep a check of its operation and be updated of its position in the cellular network.

One requirement is for the network to obtain information from the mobile stations on whether the downlink data which it is transmitting to the mobile station has been received. In the context of GSM, GPRS this is defined in GSM 04.60. Briefly, the approach in GPRS is to make use of a header portion of the data stream—the RLC/MAC (Radio Link Control/Medium Access Control) layer—which defines certain control criteria of the communication link.

The Medium Access Control (MAC) procedures include the functions related to the management of the common transmission resources, eg. the packet resource requests and packet resource configuration changes. The MAC procedures support the provision of Temporary Block Flows (TBFs) that allow the point-to-point transfer of signalling and user data within a cell between the network and the mobile station. Additionally, the MAC functions provide for measurement reporting for cell selection and re-selection.

The RLC function is responsible for: interface primitives allowing the transfer of Logical Link Control (LLC) layer PDU's between the LLC layer and the MAC function; segmentation of LLC PDU's in the RLC data blocks in reassembly of RLC data blocks into LLC/PDU, and Backward Error Correction (BER) procedures enabling the selective retransmission of RLC data blocks.

In ETSI standards MAC function is combined with RLC as one layer. RLC/MAC control blocks are used to transport RLC control messages, and only one RLC/MAC control message can be transported per RLC control block. The RLC/MAC layer comprises a series of block periods each of which is a sequence of four time slots on a packet data physical channel (PDCH) used to convey one radio block carrying one RLC/MAC protocol data unit.

Whenever the mobile station receives a RLC data block addressed to itself and with a valid RRBP (Relative Reserved Block Period) field in the RLC data block header (i.e. is polled) the mobile station transmits a packet downlink acknowledgement (ACK/NACK) message in the uplink radio block specified by the RRBP field. The acknowledgement message relates to the received downlink blocks and the quality measurement results calculated from the received blocks together with interference measurement results, and are transmitted in the uplink block based on the information in the downlink blocks (according to a certain number of bits in the downlink MAC header).

That is unless another RLC/MAC control message relating to some other information about the mobile station is waiting to be transmitted, in which case the other RLC/MAC control message is sent. However, the mobile station can only transmit an RLC/MAC control message relating to information other than packet downlink ACK/NACK at most every fourth time it is polled.

For the network to be aware of the position of the mobile station and the available options for handover the network directs a mobile station to send in measurement reports including neighbour cell information. In this context the behaviour of the mobile station is controlled by the parameter NETWORK_CONTROL_ORDER which may have the following values: NC0: 'Normal MS Control'; the mobile station does not send measurements reports and makes autonomous cell reselection, NC1: 'Mobile Station control, with the measurement report'; the mobile station sends measurement reports but makes autonomous cell reselection, NC2: 'Network Control'; the mobile station sends a measurements reports, suspend normal cell re-selection and accept network control of cell re-selection.

Accordingly, the mobile station may be directed by the network to perform neighbour cell power measurements in predefined gaps. The network indicates the location of these gaps in the packet downlink assignment message and the location and time and the size of the gaps are signalled by the following parameters: the starting time of the first TDMA frame of the first gap; a bit map indicating the time slots that are part of the gap; and the number of RLC/MAC Block periods between gaps. Once the network has signalled the gap parameters to the mobile station the network does not send an RLC/MAC block addressed to the mobile station in the time slot immediately before an assigned measurement gap, during any of the time slots of a gap or during the time slot immediately after a gap.

Neighbour cell information results are sent to the network on uplink blocks normally allocated for downlink data acknowledgement transmission. As already mentioned only a certain number of allocated uplink blocks can be used for messages other than acknowledgements and quality measurements results. In order to be able to transmit the neighbour cell measurement results as well as the required amount of acknowledgement messages, the network must send polling messages more often.

The shortest measurement period for neighbour cell re-selection measurements is 104 TDMA-frames as the maximum acknowledgement time is 64 blocks. If only one downlink time slot is allocated, the transmission of the 64 blocks last approximately 256+20 TDMA-frames (idle-frames included). Together with the fact that only every fourth of the uplink blocks allocated for the downlink ACK/NACK messages is allowed to be used for some other purposes, the neighbour message transmission with the current solution in the most stringent case will need the transmission of three extra pollings for the downlink ACK/NACK messages within every measurement period, to make it possible to send the measurement report.

Against this background the present invention aims to improve the efficiency of the use of uplink resources.

SUMMARY OF THE INVENTION

Accordingly the present invention provided a method for a radio communication network to obtain data messages from a mobile station operating therein during a unidirectional downlink transfer, the data messages being indicative of conditions at the mobile station, the method comprising the network providing a header portion of the downlink transfer having one or more unique polling codes for requesting the mobile station to transmit one or more respective data messages indicative of one or more corresponding conditions at the mobile station.

In a complementary aspect, the invention provides a radio communication system comprising a cellular network in downlink radio communication transfer with a mobile station operating therein, wherein the network provides a header portion of the transfer having one or more unique polling codes for requesting the mobile station to transmit one or more respective data messages indicative of one or more corresponding conditions at the mobile station.

By means of the invention, one or more dedicated polling messages can be transmitted for different purposes thereby separating the different cases. Thus, superfluous polling can be avoided because the messages are separated.

In a preferred embodiment, the header portion comprises the downlink RLC/MAC message header.

A BRIEF DESCRIPTION OF THE DRAWINGS

To further aid understanding of the present invention, a preferred embodiment thereof will now be described with reference to the accompanying drawings in which.

DETAILED DESCRIPTION OF THE INVENTION

Figure 1:
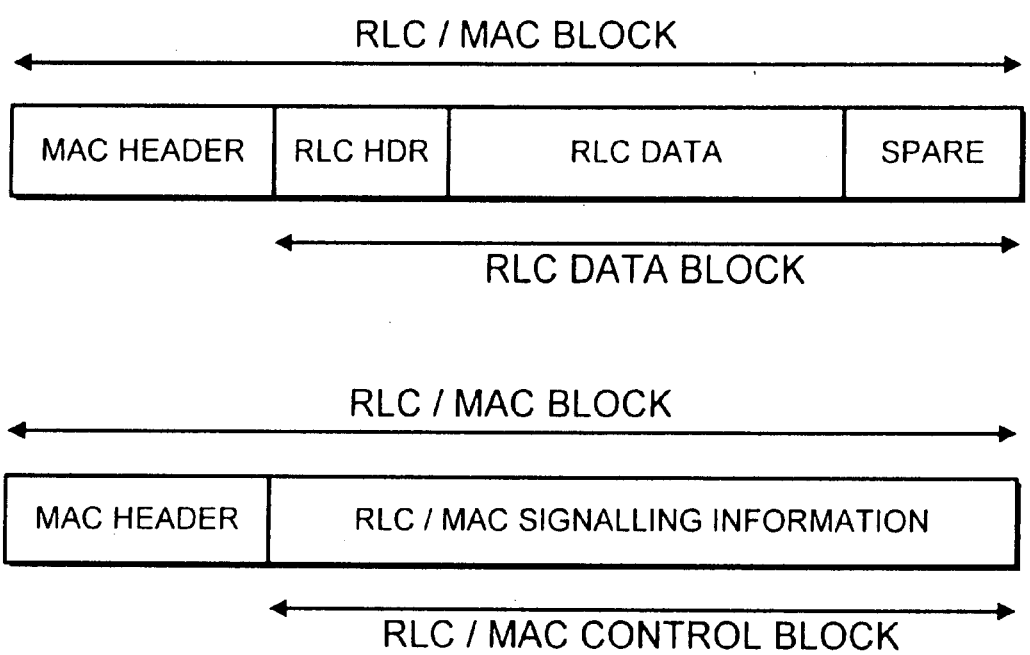
FIG. 1 is schematic diagram of a RLC/MAC block structure.

Referring to the drawings, FIG. 1 shows a RLC/MAC block structure consisting of a MAC header and a RLC data block or RLC/MAC control block.

Figure 2:
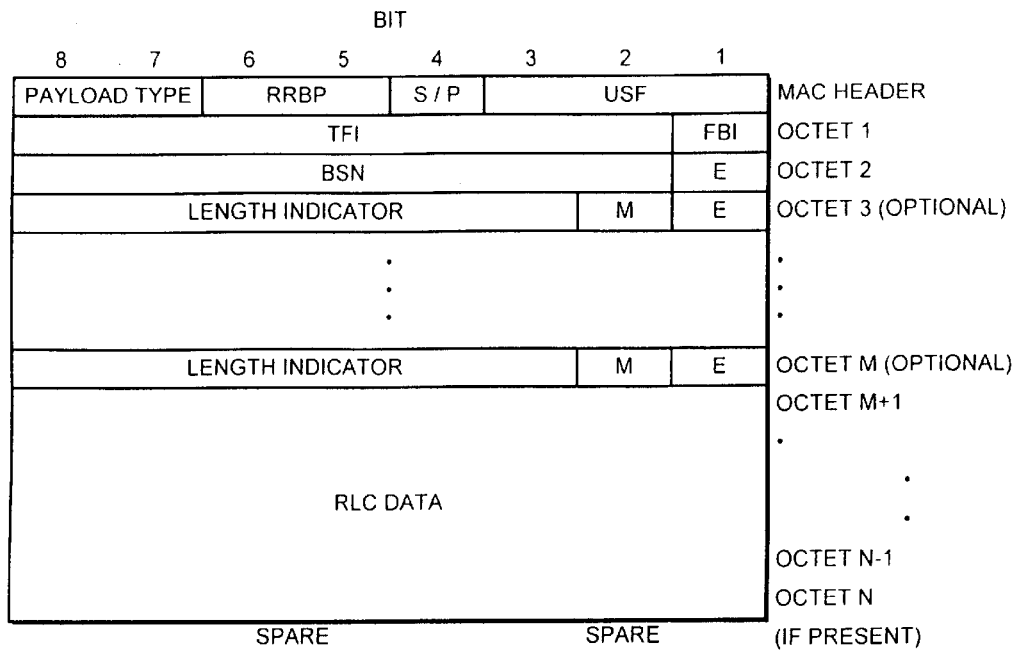
FIG. 2 is schematic diagram of a downlink RLC data block.
Figure 3:
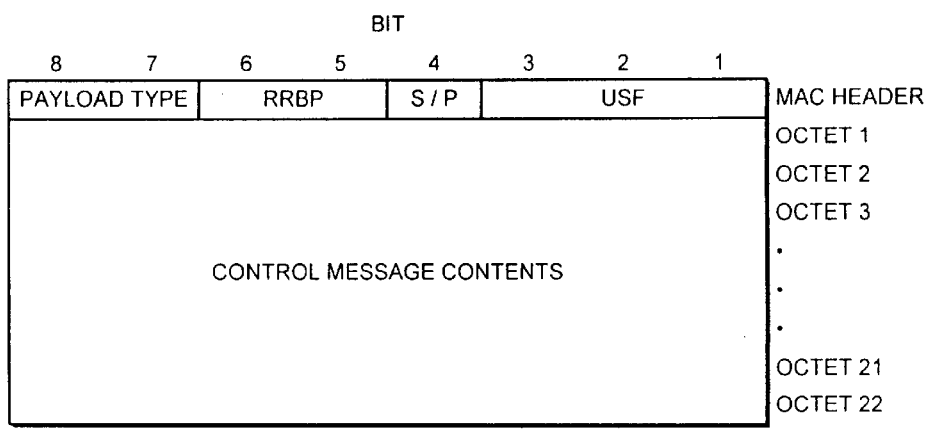
FIG. 3 is schematic diagram of a downlink RLC control block.

The format of the downlink RLC data block is shown in greater detail in FIG. 2, and that of the RLC control block is shown in FIG. 3.

The Supplementary/Polling (S/P) bit is used to indicate whether the RRBP field is valid or not valid as shown in Table 1

TABLE 1

| bit | Supplementary/Polling (S/P) bit |
|---|---|
| 1 | S/P |
| 0 | RRBP field is not valid |
| 1 | RRBP field is valid |

The interpretation of the Relative Reserved Block Period (RRBP) field depends on the value of the S/P field: the two cases are when the S/P field is valid and invalid.

When the S/P field is valid the RRBP value specifies a single uplink block in which the mobile station transmits either a PACKET CONTROL ACKNOWLEDGEMENT or a Packet Associated Control Channel (PACCH) block to the network. If the RRBP field is received as part of a RLC/MAC block containing an RLC/MAC control block, the mobile station transmits a PACKET CONTROL ACKNOWLEDGEMENT in the uplink radio block specified. If the RRBP field is received as part of a RLC/MAC block containing an RLC data block, the mobile station shall transmit a PACCH block in the specified uplink radio block.

The mobile station does not need to monitor the Uplink State Flag (USF: is used by the network to control multiplexing of different mobile stations on uplink Packet Data Channel (PDCH) measurement report) bits in the downlink RLC/MAC block before the uplink block is transmitted.

Table 2 indicates the number of TDMA frames the mobile station should wait before transmitting. The delay is relative to the first TDMA frame (N) of the downlink block containing the RRBP value.

TABLE 2

| bits | Relative Reserved Block Period (RRBP) field when S/P valid |
|---|---|
| 2 1 | Relative Reserved Block Period (RRBP) |
| 0 0 | uplink block with TDMA frame number = N + 8 or N + 9 |
| 0 1 | uplink block with TDMA frame number = N + 13 |
| 1 0 | uplink block with TDMA frame number = N + 17 or N + 18 |
| 1 1 | uplink block with TDMA frame number = N + 21 or N + 22 |

In the case where the S/P field is not valid the RRBP value specifies that the mobile station send a PACKET MEASUREMENT REPORT in single uplink block or is the value of RRBP field unused.

The mobile station need not monitor the USF bits in the downlink RLC/MAC block before the uplink block is transmitted.

Table 3 indicates the number of TDMA frames the mobile station must wait before transmitting. The delay is relative to the first TDMA frame (N) of the downlink block containing the RRBP value.

TABLE 3

Relative Reserved Block Period (RRBP) field when S/P not valid

| bits | |
|---|---|
| 2 1 | Relative Reserved Block Period (RRBP) |
| 0 1 | uplink block with TDMA frame number = N + 13 |
| 1 0 | uplink block with TDMA frame number = N +17 or N + 18 |
| 0 0 | no measurement reports are sent |
| 1 1 | no measurement reports are sent |

The network allocates uplink block for sending the measurement report by setting the RRBP and S/P bits in the downlink block MAC-header according to the values specified in Table 4.

TABLE 4

| S/P | RRBP | Description |
|---|---|---|
| 0 | 00 | No polling |
| 0 | 01 | Polling for the measurement report, uplink block with TDMA-frame number = N + 13 |
| 0 | 10 | Polling for the measurement report, uplink block with TDMA-frame number = N + 17 or N = 18 |
| 0 | 11 | Extra polling for measurement report supported by network |
| 1 | Any value | Polling for downlink ACK/NACK, as stated in the ETSI GPRS specification 04.60 |

By modifying the downlink RLC/MAC header in this way, the pollings for the neighbor measurement and the packet acknowledgement messages are seperated, and the network can allocate uplink resources more efficiently because the extra packet downlink messages do not be need to be sent.

The present invention may be embodied in other specific forms without departing from its essential attributes. The embodiments that have been described concern feeding backing information at the network's request from the mobile station to the network; information such as an acknowledgement that certain transmitted data has been received, or information about the characteristics of surrounding cells. The invention is not limited to such applications and could be used to feed back other types of information, for example information about the radio link itself such as the transmission power for either or both of network base stations and mobile stations, and other situational and environmental information. Accordingly reference should be made to the appended claims and other general statements herein rather than to the foregoing specific description as indicating the scope of invention.

Furthermore, each feature disclosed in this specification (which term includes the claims) and/or shown in the drawings may be incorporated in the invention independently of other disclosed and/or illustrated features. In this regard, the invention includes any novel features or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for a radio communication network to obtain data messages from a mobile station operating therein during unidirectional downlink transfer, a first data message being indicative of downlink data acknowledgement/non-acknowledgement, and a second data message being indicative of measurement result conditions at the mobile station, the method comprising the steps of:

the network providing in a header portion of the downlink transfer a first polling code representative of a first polling state for requesting the mobile station to transmit said first data message, and the method being characterised in that the network provides in a header portion of the downlink transfer a second polling code representative of a second polling state for requesting the mobile station to transmit said second data message, said second polling code being different from the first polling code such that the second polling state is different from the first polling state.

2. A method according to claim 1, wherein the radio communication system comprises a GPRS system and the first and second polling codes are transmitted in a downlink RLC/MAC block.

3. A method according to claim 2, wherein the first and second polling codes comprise S/P bits in a header of the RLC/MAC block, and said first polling state is representative of a valid S/P state and said second polling state is representative of an invalid S/P state, so that when the S/P bits provide an invalid state the mobile station is requested to transmit said second data message.

4. A method according to claim 1, wherein said second polling code that is representative of said second polling state requests the mobile station to transmit said second data message, wherein said second data message is provided for determining transfer conditions.

5. A method according to claim 4, wherein said transfer conditions comprise neighbour cell measurement report.

6. A method according to claim 1, wherein said second polling code that is representative of said second polling state requests the mobile station to transmit said second data message, wherein said second data message is provided for determining data flow between the mobile station and the network.

7. A method according to claim 1, wherein said second polling code is provided for requesting the mobile station to provide transmission power level information.

8. A radio communication system comprising a cellular network in downlink radio communication transfer with a mobile station operating therein, the system providing for the network to obtain first and second data messages from the mobile station, wherein the network provides in a header portion of the transfer a first polling code representative of a first polling state for requesting the mobile station to transmit a first data message indicative of downlink data acknowledgement/non-acknowledgement, the system being characterised in that the network provides in a header portion of the downlink transfer a second polling code representative of a second polling state for requesting the mobile station to transmit a second data message indicative of measurement result conditions at the mobile station, said second polling code being different from the first polling code such that the second polling state is different from the first polling state.

9. A control system for a radio communication network, the network being capable of downlink radio communication transfer with a mobile station, the control system comprising means for configuring a header portion of the downlink transfer, said means for configuring the header portion comprising:

means for generating a first polling code representative of a first polling state for requesting the mobile station to transmit a first data message indicative of downlink data acknowledgement/non-acknowledgement, the system being characterised in that said means for configuring the header portion comprises means for generating a second polling code representative of a second polling state for requesting the mobile station to transmit a second data message indicative of measurement result conditions at the mobile station, said second polling code being different from the first polling code such that the second polling state is different from the first polling state.

10. A radio communication system network element comprising a control system, the network element being capable of downlink radio communication transfer with a mobile station, the network element comprising means configuring a header portion of the downlink transfer, said means for configuring the header portion comprising:

means for generating a first polling code representative of a first polling state for requesting the mobile station to transmit a first data message indicative of downlink data acknowledgement/non-acknowledgement, the network element being characterised in that said means for configuring the header portion comprises means for generating a second polling code representative of second polling state for requesting the mobile station to transmit a second data message indicative of measurement result conditions at the mobile station, said second polling code being different from the first polling code such that the second polling state is different from the first polling state.

11. A mobile station for use in a radio communication system, the mobile station being capable of downlink radio communication transfer with the radio communication system, the mobile station having a controller and the controller being adapted to be responsive to a first polling code representative of a first polling state provided in a header portion of the downlink transfer so as to transmit a first data message indicative of downlink data acknowledgement/non-acknowledgement, characterised in that the controller is adapted to be responsive to a second polling coded representative of a second polling state provided in a header portion of the downlink transfer so as to transmit a second data message indicative of measurement result conditions at the mobile station, said second polling code being different from the first polling code such that the second polling state is different from the first polling state.

12. A method for a radio communication network to obtain data messages from a mobile station operating therein during unidirectional downlink transfer, a first data message being indicative of downlink data acknowledgement/non-acknowledgement, and a second data message being indicative of measurement result conditions at the mobile station at least including data indicative of measurement report, the method comprising the network providing in a header portion of the downlink transfer a first polling code for said data acknowledgement/non-acknowledgement, and the method being characterised in that the network provides in a header portion of the downlink transfer a second polling code for requesting the mobile station to transmit said measurement report, said second polling code being different from, the first polling code, and wherein the first and second polling codes are transmitted in a header of a downlink RLC/MAC block.

13. A method according to claim 12, wherein the measurement report comprises channel quality report.

14. A method according to claim 12, wherein the second data message includes data relating to the first data message.

15. A method for a radio communication network to obtain data messages from a mobile station operating therein during unidirectional downlink transfer, the method comprising:

the network providing in a header portion of the downlink transfer a first polling code for obtaining from the mobile station a data message indicative of downlink data acknowledgement/non-acknowledgement; and the network providing in a header portion of the downlink transfer a second polling code for obtaining from the mobile station a data message indicative of said downlink data acknowledgement/non-acknowledgement and indicative of one or more other conditions at the mobile station at least including data indicative of measurement report, said second polling code being different from the first polling code, and wherein the first and second polling codes are transmitted in a header of a downlink RLC/MAC block.

16. A method according to claim 15, wherein the second data message includes data relating to the first data message.

17. A method for a radio communication network to obtain data messages from a mobile station operating therein during unidirectional downlink transfer, the method comprising:

the network providing, in a header portion of the downlink transfer, a first polling code for obtaining from the mobile station a data message indicative of downlink data acknowledgement/non-acknowledgement and the network providing, in a header portion of the downlink transfer, a second polling code for obtaining from the mobile station a data message indicative of said downlink data acknowledgement/non-acknowledgement and indicative of one or more other conditions at the mobile station at least including data indicative of measurement report, said second polling code being different from the first polling code, and wherein the first and second polling codes are transmitted in a header of a downlink RLG/MAC block.

* * * * *